United States Patent
Moreau et al.

(10) Patent No.: US 10,902,498 B2
(45) Date of Patent: Jan. 26, 2021

(54) PROVIDING CONTENT BASED ON ABANDONMENT OF AN ITEM IN A PHYSICAL SHOPPING CART

(71) Applicant: ADOBE INC., San Jose, CA (US)

(72) Inventors: Stephane Moreau, L'Hay les Roses (FR); Sachin Soni, New Delhi (IN); Ashish Duggal, Delhi (IN); Anmol Dhawan, Ghaziabad (IN)

(73) Assignee: ADOBE INC., San Jose, CA (US)

( * ) Notice: Subject to any disclaimer, the term of this patent is extended or adjusted under 35 U.S.C. 154(b) by 790 days.

(21) Appl. No.: 15/015,980

(22) Filed: Feb. 4, 2016

(65) Prior Publication Data
US 2017/0228811 A1    Aug. 10, 2017

(51) Int. Cl.
*G06Q 30/06* (2012.01)
*G06Q 30/02* (2012.01)

(52) U.S. Cl.
CPC ..... *G06Q 30/0633* (2013.01); *G06Q 30/0224* (2013.01); *G06Q 30/0639* (2013.01)

(58) Field of Classification Search
CPC .. Y10S 280/04; B62B 5/0096; G06Q 30/0639
See application file for complete search history.

(56) References Cited

U.S. PATENT DOCUMENTS

| | | | | |
|---|---|---|---|---|
| 7,899,710 B1 * | 3/2011 | Walker | ............... | G06Q 30/0224 705/14.54 |
| 9,153,141 B1 * | 10/2015 | Kane, Jr. | ................. | G09B 7/00 |
| 2006/0089918 A1 * | 4/2006 | Avanzi | ................. | G06Q 20/382 705/64 |
| 2011/0276385 A1 * | 11/2011 | Keller | ................ | G06Q 30/0238 705/14.38 |
| 2012/0158482 A1 * | 6/2012 | Paradise | ............ | G06Q 30/0633 705/14.25 |
| 2013/0297422 A1 * | 11/2013 | Hunter | .................. | H04W 4/023 705/14.58 |
| 2014/0156392 A1 * | 6/2014 | Ouimet | .............. | G06Q 30/0633 705/14.49 |

(Continued)

FOREIGN PATENT DOCUMENTS

WO    WO-2013134865 A1 *    9/2013    ........... G07G 1/0081

OTHER PUBLICATIONS

Yih et al, Pervasive Computing Technologies for Retail In-Store Shopping, 2005, IEEE, 0-7803-9032-6, p. 111-116 (Year: 2005).*

(Continued)

*Primary Examiner* — Marie P Brady
(74) *Attorney, Agent, or Firm* — Shook, Hardy & Bacon L.L.P.

(57) ABSTRACT

Embodiments of the present invention provide systems, methods, and computer storage media directed to providing targeted content related to sentiment associated with products. In one embodiment, an item is detected as being positioned in a physical shopping cart at a first time, the physical shopping cart being use by a user having a user device. At a second time after the first time, the item is detected as being removed from the physical shopping cart. Based on detecting the item as being removed from the physical shopping cart, content related to the item is provided to the user device of the user, the content intended to result in the user purchasing the item.

20 Claims, 6 Drawing Sheets

(56) References Cited

U.S. PATENT DOCUMENTS

| | | | | |
|---|---|---|---|---|
| 2014/0164176 A1* | 6/2014 | Kitlyar | ............... | G06Q 30/0633 |
| | | | | 705/26.8 |
| 2015/0112836 A1* | 4/2015 | Godsey | .............. | G06Q 30/0613 |
| | | | | 705/26.41 |
| 2015/0221016 A1* | 8/2015 | Schulz | ............... | G06Q 30/0631 |
| | | | | 705/26.7 |
| 2017/0169440 A1* | 6/2017 | Dey | ................... | G06Q 30/0201 |
| 2019/0087862 A1* | 3/2019 | Schiano | ............. | G06Q 30/0261 |

OTHER PUBLICATIONS

Apple, Inc. (Jun. 2014), Getting Started with iBeacon, Version 1.0. (11 pages). Retrieved May 23, 2018 from the Internet at <https://web.archive.org/web/20140603015640/https://developer.apple.com/ibeacon/Getting-Started-with-iBeacon.pdf>.

Smith, C. (Apr. 2014). Shopping Cart Abandonment: Online Retailers' Biggest Headache Is Actually a Huge Opportunity. Business Insider. (4 pages). Retrieved May 23, 2018 from the Internet at <https://web.archive.org/web/20140428052534/https://www.businessinsider.in/Shopping-Cart-Abandonment-Online-Retailers-Biggest-Headache-Is-Actually-A-Huge-Opportunity/articleshow/34169740.cms>.

* cited by examiner

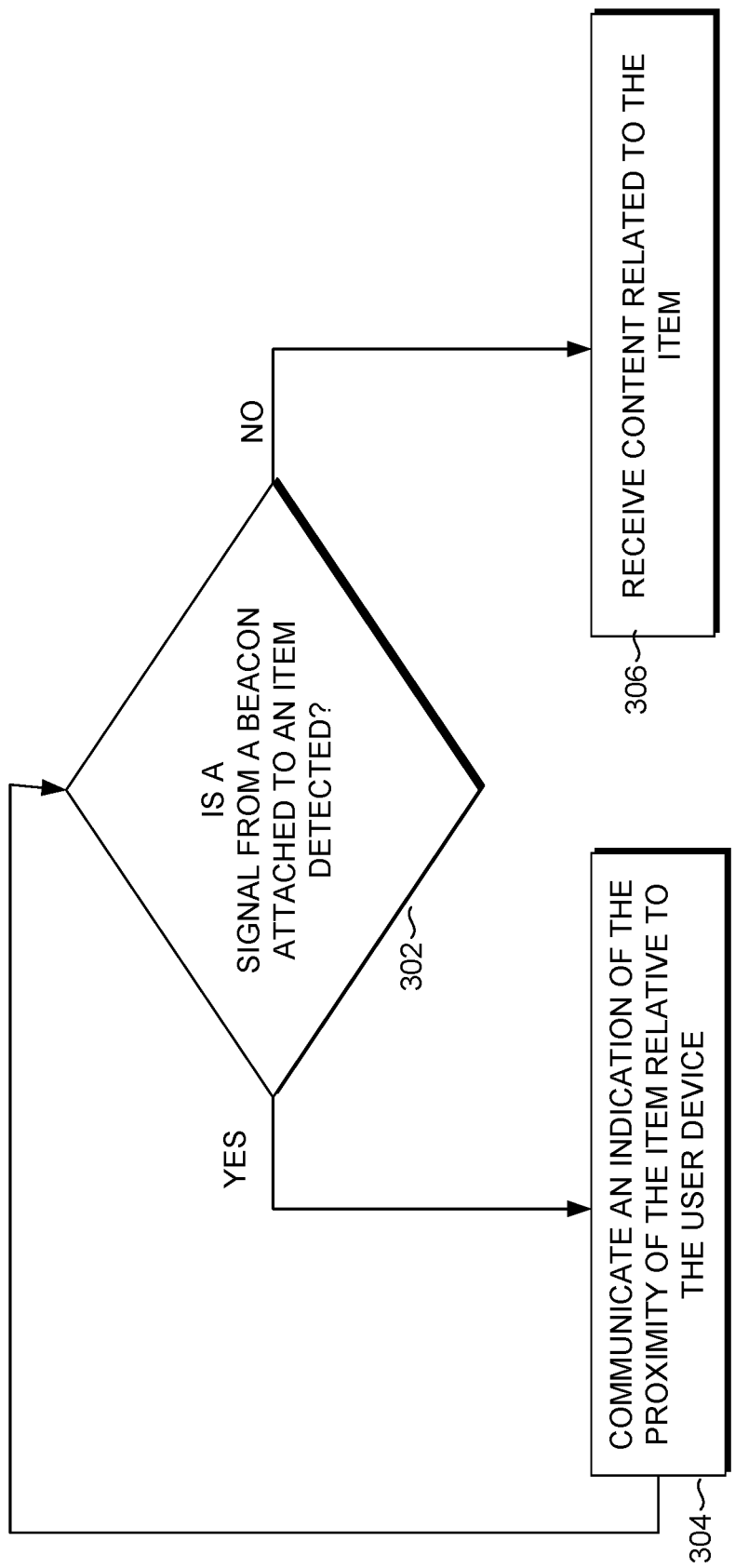

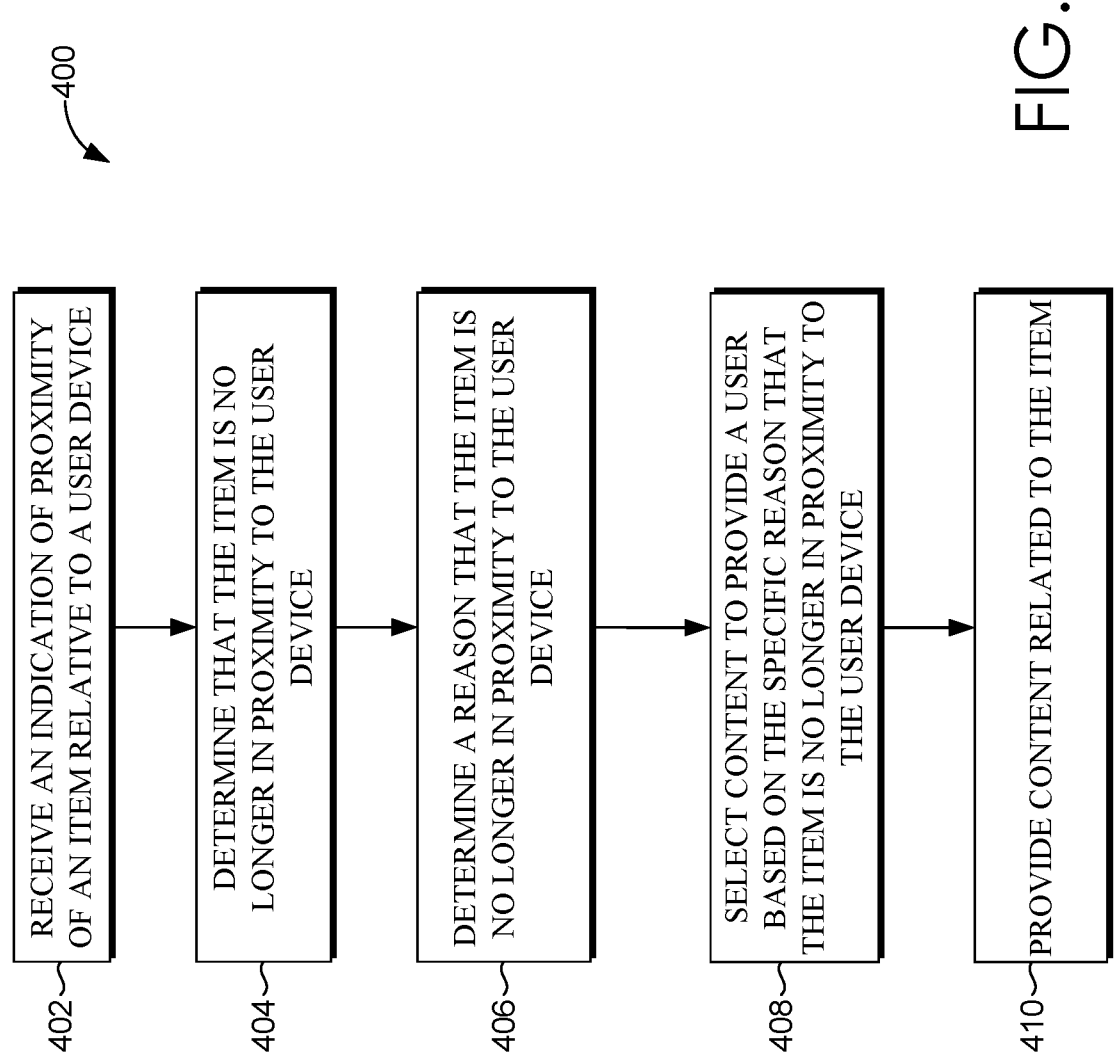

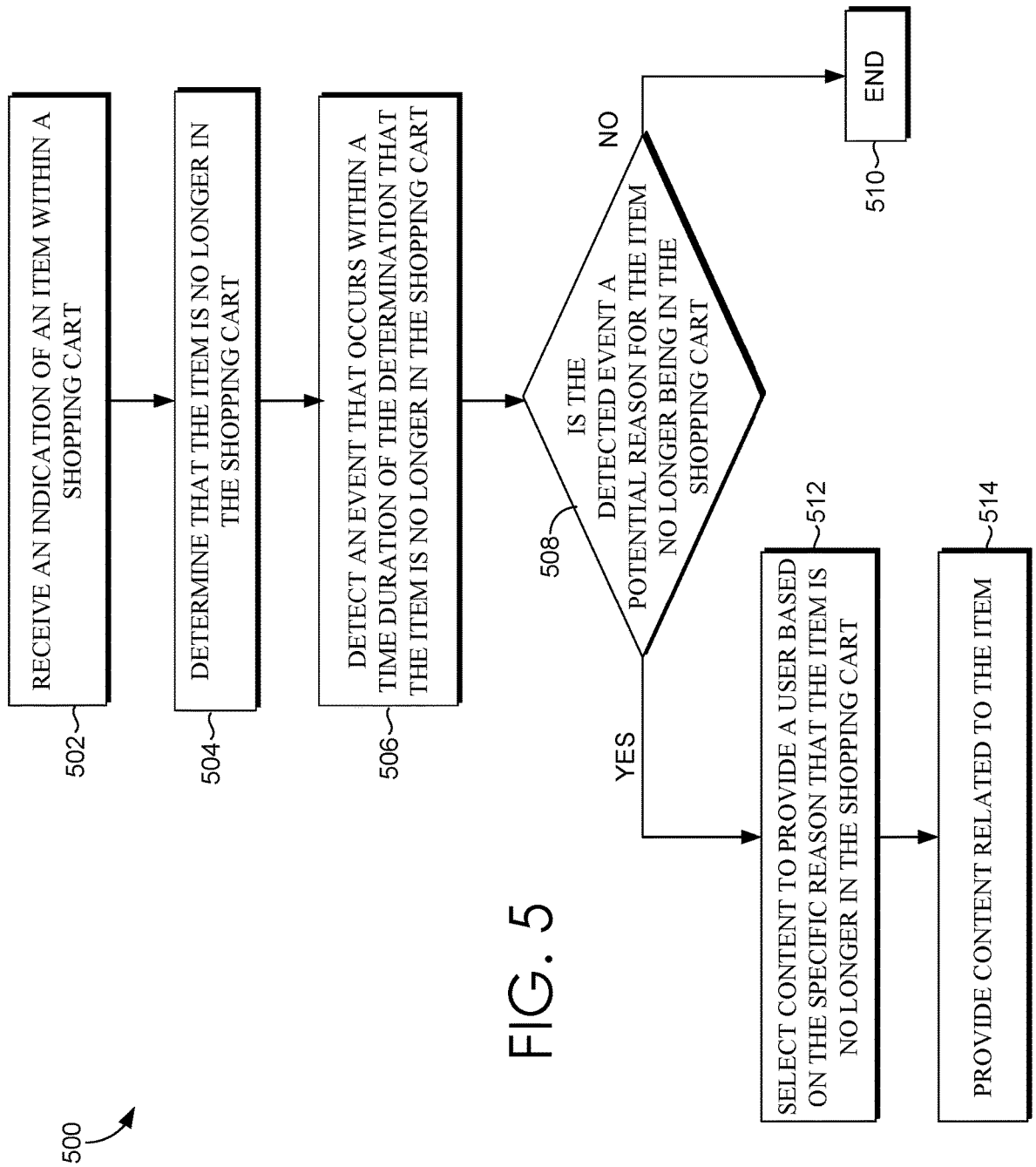

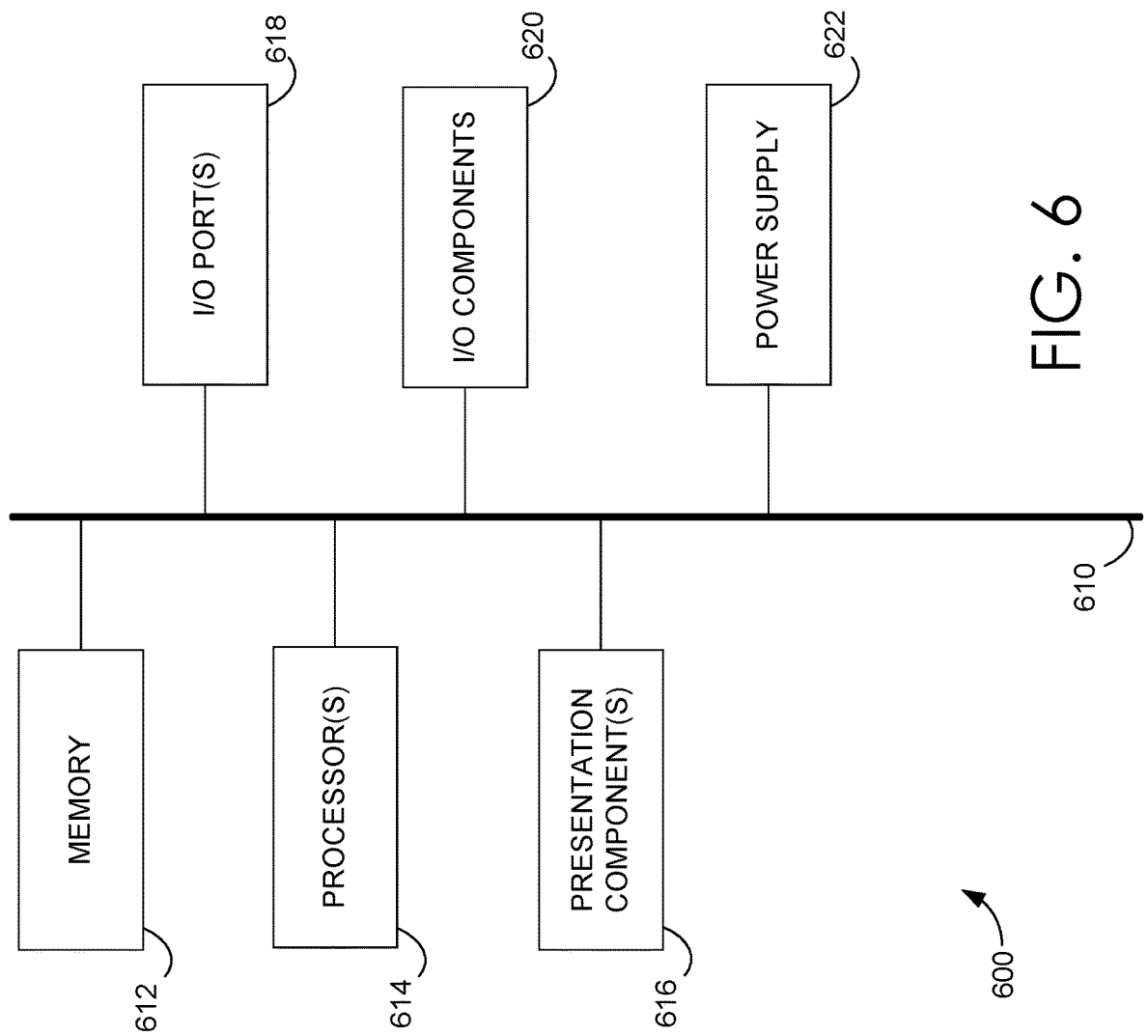

PROVIDING CONTENT BASED ON ABANDONMENT OF AN ITEM IN A PHYSICAL SHOPPING CART

BACKGROUND

Online consumers oftentimes abandon online shopping carts containing one or more items to be purchased before actually completing a purchase. To the disappointment of online retailers, far too many items are abandoned in online shopping carts. With an increasing shopping cart abandonment rate, online retailers are increasingly foregoing potential revenue. A reduced rate of abandonment and increased number of conversions can be achieved by retargeting online consumers with offers, for example, upon determining an online shopping cart abandonment has occurred. For instance, emails sent after consumers abandon online shopping carts average a 40% open rate and a 20% click-through rate. Such email offers can be targeted messages personalized for the consumer that are communicated upon determining an online shopping cart abandonment has occurred. In particular, when an online consumer is identified as having abandoned an online shopping cart, a message can be sent to the consumer nearly immediately that provides a personalized incentive, such as a discount coupon or free shipping, in order to entice the consumer to complete the purchase that was not previously completed.

While incentives, such as discount coupons and free shipping, incentivize or entice some consumers to return to an electronic shopping cart to complete a purchase, many consumers abandon items within a physical shopping cart while shopping within a retail store. For example, while shopping at a retail store (a brick and mortar store), assume a consumer has placed an item in his or her physical shopping cart. Now assume that the consumer ultimately decides not to purchase the item. For example, the consumer may decide to purchase another similar product or decide the product is not needed. Abandoning an item in a physical shopping cart, however, does not result in an offer being provided to the consumer. In such cases of a lack of an incentive or offer, a consumer may not be incentivized to ultimately purchase the abandoned item thereby resulting in a loss of potential revenue to the retail store, distributor of the product, and/or manufacturer of the product.

SUMMARY

Embodiments of the present invention relate to methods, systems, and computer readable media for facilitating providing targeted content to retail consumers based on abandonment of an item(s) previously placed in a physical shopping cart. That is, content, such as an offer, related to an item abandoned from a physical shopping cart is provided to the consumer. Providing content related to an item abandoned from a physical shopping cart can entice the consumer to ultimately purchase the item. To identify targeted content to provide to consumers, embodiments of the present invention detect when an item has been abandoned from a physical shopping cart. Upon determining that an item has been abandoned, content can be provided to the consumer to entice the user to purchase the item. In some implementations, a reason for the item abandonment can be determined and used to select appropriate content (e.g., offer) to provide to the consumer.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 3 is a flow diagram showing a method for receiving targeted content in response to detection of an item abandonment, in accordance with an embodiment of the present invention;

FIG. 4 is a flow diagram showing a method for providing targeted content related to an item deemed abandoned, in accordance with an embodiment of the present invention;

FIG. 5 is a flow diagram showing another method for providing targeted content related to an item deemed abandoned, in accordance with an embodiment of the present invention; and FIG. 6 is a block diagram of an exemplary computing environment suitable for use in implementing embodiments of the present invention.

DETAILED DESCRIPTION

Figure 1:
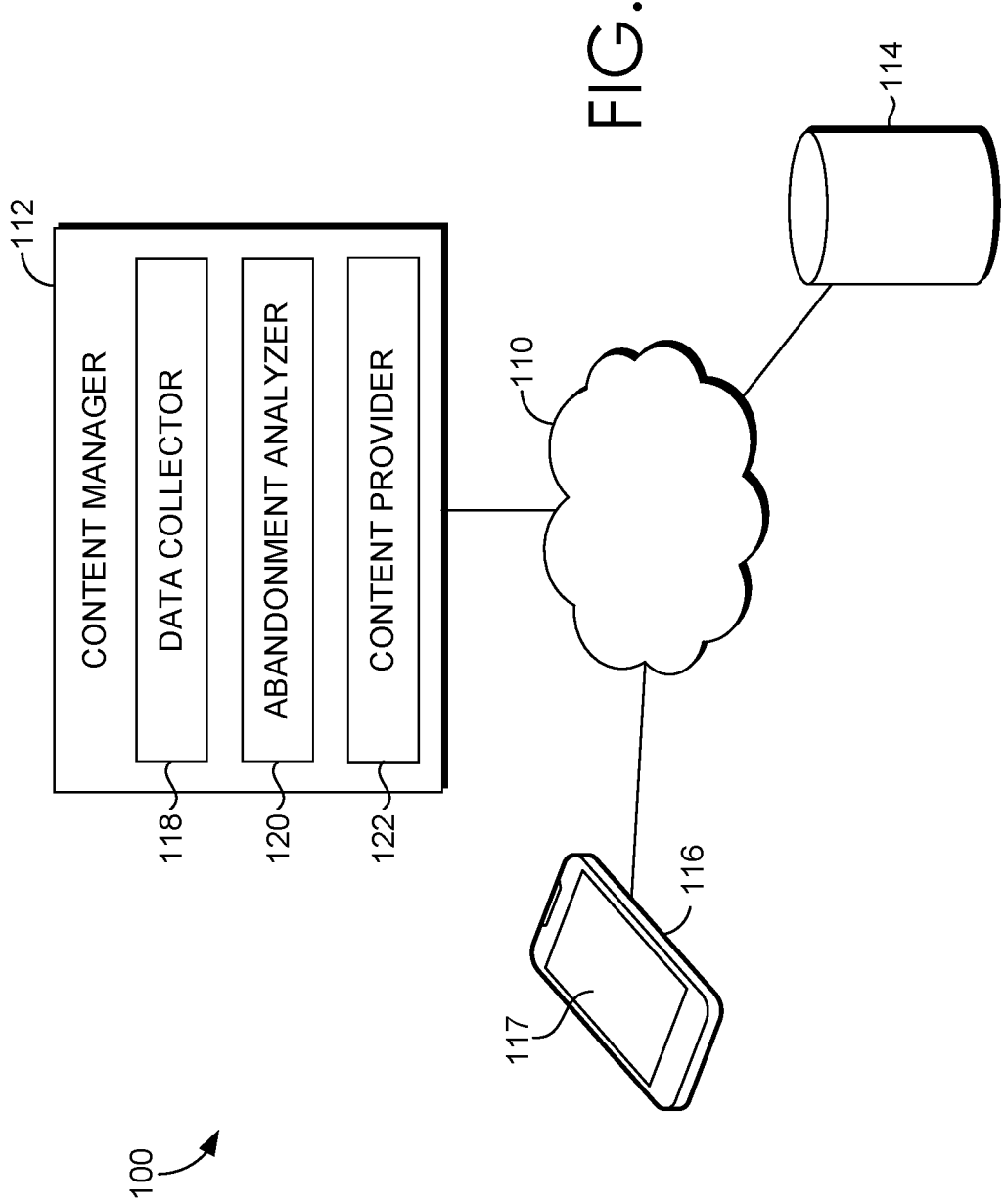
FIG. 1 is a schematic depiction of a system for providing content based on abandonment of an item in a physical shopping cart, in accordance with embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, systems, and computer readable media for facilitating providing targeted content to consumers in an effort to incentivize a consumer to purchase an item(s) previously included in a physical shopping cart and, thereafter, abandoned from the shopping cart. An item within a physical shopping cart can be deemed abandoned in any manner, such as, for instance, when a consumer places an item within a physical shopping cart and subsequently removes the item from the shopping cart. To identify shopping cart abandonment, embodiments of the present invention can utilize beacons and/or RFID technology to determine when an item placed in a physical shopping cart is, at a later time, removed or abandoned from the shopping cart. In this regard, for example, a beacon tag placed on an item can be used to detect proximity to a consumer. Based on an item no longer being near the consumer, the item can be deemed abandoned from the shopping cart. In accordance with the item being considered abandoned from the shopping cart, targeted content, such as an offer, can be provided to the consumer to entice the consumer to return to purchase the item.

As described herein, a reason for an item abandonment can be used to determine a time, a manner, or content details to provide to a consumer in relation to the abandoned item. For example, an item may have been abandoned by a consumer due to a consumer interest in a competitor product, a consumer interest in more information about the item, a consumer decision that the item is not necessary (e.g., based on a budget or shopping cart capacity). A reason for the item abandonment can be identified using, for example, timing of the item abandonment in relation to other actions performed by the consumer. For example, a consumer viewing an advertisement by a competing product around the time an item is removed from a physical shopping cart may be a basis for determining the consumer abandoned the item based on an interest in a competing product. By providing relevant content to consumers based on the reason for abandonment of an item(s), the likelihood of a consumer ultimately completing a purchase of the item increases, thereby increasing profitability of retailers, manufacturers, etc. For example, targeted content such as product specifications, reviews related to a product or product feature, or the like can be provided to the consumer in an effort to alleviate product concerns of the consumer. As another example, targeted content such as product discounts or free shipping can alleviate item pricing or shopping cart capacity concerns of a consumer.

Generally, a physical shopping cart is used herein to refer to a tangible shopping cart, basket, or other mechanism for carrying items (such as products) for use in a physical environment. As such, a physical shopping cart can be used in a physical store, such as physical retail store, or a brick and mortar store or shopping center. A physical shopping cart, as used herein, does not include an online shopping cart used for electronic purchases.

Although aspects of the invention are generally described as providing targeted content in response to detection or prediction of an item abandoned from a physical shopping cart, embodiments are not intended to be limited herein. For example, targeted content may be provided to a user that has added an item to a physical shopping cart, but the item within the physical shopping cart is not yet deemed abandoned. Further, embodiments of the present invention are contemplated for use even when an item has not been added to a physical shopping cart. For instance, based on proximity of an item to a consumer, a consumer viewing the item may be provided with content to entice the user to add the item to a physical shopping cart for purchase of the item.

Turning now to FIG. 1, a block diagram is illustrated that shows an exemplary computing system environment 100 suitable for use in implementing embodiments of the present invention. It will be understood and appreciated that the computing system environment 100 shown in FIG. 1 is merely an example of one suitable computing system environment and is not intended to suggest any limitation as to the scope of use or functionality of embodiments of the present invention. Neither should the computing system environment 100 be interpreted as having any dependency or requirement related to any single module/component or combination of modules/components illustrated therein.

The computing system environment 100 includes a content manager 112, a data store 114, and user device 116 all in communication with one another via a network 110. The network 110 may include, without limitation, one or more local area networks (LANs) and/or wide area networks (WANs). Such networking environments are commonplace in offices, enterprise-wide computer networks, intranets and the Internet. Accordingly, the network 110 is not further described herein.

In some embodiments, one or more of the illustrated components/modules may be implemented as stand-alone applications. In other embodiments, one or more of the illustrated components/modules may be integrated directly into an operating system. The components/modules illustrated in FIG. 1 are exemplary in nature and in number and should not be construed as limiting. Any number of components/modules may be employed to achieve the desired functionality within the scope of embodiments hereof. Further, components/modules may be located on any number of servers, computing devices, or the like. By way of example only, the content manager 112 might reside on a server, cluster of servers, or a computing device remote from or integrated with one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The data store 114 is configured to store information used in association with the content manager 112, such as data collected via data collector 118. In embodiments, the data store 114 stores data associated with locations, users, items, content, or the like. In various embodiments, such information pertaining to location may include location of users, location of items, or the like. Information pertaining to one or more users may include user identifiers, user interests, purchase probability or conversion rate, value or priority level of users, etc. Item data may include any data related to an item, such as a product name, a product description, a product specification, etc. Content data generally refers to any data related to content to be provided to a user, such as advertisements, offers, product information, etc. Such data may be received from a user device(s) or a beacon(s), or derived (e.g., from data received from a user device(s) or a beacon(s) or other collected data). Content data may include data used to generate content. In embodiments, the data store 114 is configured to be searchable for one or more of the items stored in association therewith. The information stored in association with the data store 114 may be configurable and may include any information relevant to locations, users, items, content, and/or the like. The content and volume of such information are not intended to limit the scope of embodiments of the present invention in any way. Further, though illustrated as a single, independent component, the data store 114 may, in fact, be a plurality of storage devices, for instance, a database cluster, portions of which may reside on the offer manager 112, user devices 116, and/or any combination thereof.

The user device 116 may be any type of device suitable for facilitating identifying abandonment of an item from a physical shopping cart and/or present content related to an abandoned item. Such computing devices may include, without limitation, a computer, such as, for example, computing device 600 described below with reference to FIG. 6.

User devices may include tablet PCs, PDAs, mobile phones, smart phones, as well as conventional display devices such as televisions, or any Internet of Things devices (e.g., game consoles, kiosks, appliances, etc.). A user, as used herein, refers to an individual, entity, or consumer that operates a user device. Generally, a user operates a user device in a physical shopping or retail environment, oftentimes referred to as a brick and mortar store.

In some embodiments, the user device 116 can facilitate identifying item abandonment by providing location data, for instance, to the content manager 112. To this end, location data may be captured by the user device and provided along with or in addition to other data provided to the content manager 112, or other component. Location data refers to any data indicating a location of a user, a user device, a shopping cart, an item, an electronic display, or other object that can be used to detect item abandonment from a physical shopping cart and/or to determine content to provide to a user. Any technology can be used to obtain and provide location data and is not intended to limit the scope of embodiments of the present invention.

For example, in some implementations, a user device can communicate with beacons to obtain location data. Upon obtaining location data, the user device can provide the location data to the content manager 112. Beacons may be static beacons or mobile beacons. A static beacon refers to a beacon that typically remains in a specific location. A static beacon may be placed, for example, in a particular location within a store to indicate a section or location within the store or an electronic display placed in the store. Typically, a static beacon has a bigger battery and is designed for retail stores for deployment at entrances, product sections, checkout counters, electronic displays, etc. A mobile beacon (also sometimes referred to as a beacon tag) refers to a beacon that is associated with an object that might be moved by a consumer shopping within a store. For instance, static beacons can be distributed in fixed positions throughout a retail store, while mobile beacons can be distributed on shopping carts and items throughout the store that can be moved at any time by a consumer. A mobile beacon can be attached to an individual product resulting in the product being a "wearable," that is, a smart product fully detectable by a mobile device.

Beacons may use Bluetooth® technology to detect and communicate with nearby user devices as the user device approaches a beacon, as described in more detail below. In some embodiments, a user device may have an application installed on the user device, such as a retailer application, a multi-retailer application (e.g., Shopkick), or any other application that might interact with beacons disbursed in retail store locations. For example, a mobile application installed on a user device can be provided by a retailer or third-party (e.g., New York Times or a product company providing a product or item). An operating system (OS) of a user device might additionally or alternatively detect or identify beacon signals transmitted from beacons. An application or OS on a user device can receive or detect a nearest beacon signal placed in a location, section, item, or shopping cart within the retail store. As can be appreciated, in some cases, a mobile application can receive a beacon signal even when the application is operating in a background state. For instance, in the event an application is not actively running, a mobile operating system can launch the application automatically in the background if a nearby beacon of interest is detected. In some cases, the application may register an identification of beacons in which it is interested (e.g., UUIDs) with the operating system and/or a specified distance range with the beacons of interest.

Beacons generally use Bluetooth Low Energy (BLE) to transmit data over short distances. BLE communication generally includes advertisements of packets of data that are broadcast at regular intervals through radio waves. The packets of data can then be detected by smart devices nearby, which can be used to trigger events (e.g., prompts, push notifications, and application actions). An advertising packet can include various components of data that can be used to identify the transmitting beacon and location of user device relative to the beacon. For example, an advertising packet can include a universally unique identifier (UUID) (e.g., a 16 byte string format that distinguishes an entity's beacons from others), a major value (e.g., a 2 byte string used to specify a beacon within a group), a minor value (e.g., a 2 byte string used to identify specific beacons), and a proximity value (e.g., provides signal strength to indicate proximity relative to the beacon). The UUID, major value, and minor value can together form an identifier used to identify the particular beacon being communicated with. To this end, the user device can recognize which beacon is nearby on the basis of these values. Another byte in the packet indicating location (proximity value) can be used to determine distance from the beacon. A proximity value can be represented by a RSSI value (Received Signal Strength Indication) measured relative to the Beacon.

Upon detecting or receiving an advertising packet broadcast from a nearby beacon, the user device can provide the data to the content manager 112 (or other component) and/or use the data to derive location data. For example, the user device can determine the nearby beacon based on the beacon identifier contained in the advertising packet as well as the relative proximity to the beacon using the proximity value. In this regard, the user device can determine an extent or a distance range near the beacon, such as immediate distance (e.g., within a few centimeters), near (e.g., within a couple of meters), or far (e.g., greater than 10 meters). As can be appreciated, any distance metrics and/or distance ranges can be used to represent proximity to a nearby beacon as location data. As such, the user device can be used to approximate when a user has entered, exited, or lingered in a region, or when a user is within a proximity of an item or other object (e.g., electronic display). Depending on the customer's proximity to a beacon (e.g., a static beacon or a mobile beacon), the user may receive different levels of interaction at each of the different levels of proximity. In this regard, upon identifying the UUID, major number, minor number, and proximity value, a given application can decide whether to act or not.

RFID technology may also be used to provide location data. For example, items may be attached with RFID tags, while shopping carts have RFID readers. In this case, the RFID reader on the shopping cart can read the tags of items placed in the shopping cart. The RFID reader can then provide data to the user device and/or content manager 112 to indicate location data. Further, in cases that the shopping cart includes a beacon, the beacon can communicate with the user device to indicate the user associated with the shopping cart.

Location data can also include acceleration data. In some cases, beacon tags, such as mobile beacons, can have a built-in accelerometer that records movement of an object (e.g., an item). As such, when an object is moved by a consumer, movement of the object can be detected and recorded. Beacons can be equipped with accelerometers and temperature sensors, enabling measurement of both motion (e.g., movement, number of times in motion since last counter reset, etc.) and the surrounding environment.

Although beacon and RFID technology is generally discussed herein, as can be appreciated, any other technology can be utilized to obtain location data. For example, near field communication (NFC) technology, mobile micro geo location technology, etc. can be used. As another example, GPS technology or Wi-Fi technology deployed on a user device can be used to detect location data. Any technology can be used to obtain location data and such technology is not intended to limit the scope of embodiments of the present invention. In this regard, signals can be communicated from any Internet of Things (IoT) sensors.

Location data detected or obtained at the user device 116 can be provided to the content manager 112. As can be appreciated, location data can be communicated in any format and at any time. For example, location data might be provided as an actual position location (e.g., using GPS data) or a distance from a beacon (e.g., distance value or distance range). Further, location data might be communicated immediately after detected or collected and periodically communicated.

In communicating with the content manager 112, the user device can provide a user device identifier such that the user device, or user thereof, can be recognized. In some cases, a subscriber ID method is used. A subscriber ID method uses any number of HTTP subscriber ID headers that uniquely identify a mobile device. The headers often include the device phone number (or a hashed version of the number) or other identifiers. The headers contain information on device ID, client ID, calling line ID, etc. Such information can be used to identify the user and his or her interests.

In addition to providing location data, a user device can be used to facilitate presenting targeted content to the user. For example, upon content manager 112 selecting content and providing the content to the user device 116 as described in more detail below, the user device can present the content to the user. As shown, the user device 116 includes a display screen 117. The display screen 117 is configured to display information to the user of the user device 116, for instance, information relevant to communications initiated by and/or received by the user device 116, information concerning content, and/or the like.

In embodiments, the user device 116 receives content, for example, provided by the content manager 112, and presents the content via a display screen of the user device. Targeted content can be in any form, such as a push notification via an application or a targeted experience via a webpage such as a landing page. In this regard, in accordance with a content manager, or other component, providing or transmitting content data to the user device 116, the user device can present the content on a display screen via a push notification (e.g., through an application running on the device) or a webpage (e.g., through a web browser or browser application running on the device). For instance, when a user exits a store or a store section, a push notification of a personalized offer related to men's apparel may be sent to the user device (e.g., based on abandonment of a men's apparel item). When the user opens a retailer application after abandoning the men's apparel item, the landing page of the application may show images of some apparel items from the men's section along with an offer for men's apparel.

In some implementations, the various states of an application running on the user device can designate how content is provided to the user. For example, when an application is running (an active state), content can be presented to the user via an in-application message. By contrast, when the application is running in the background (background state), content can be presented to the user via a push notification.

Turning to the content manager 112, the content manager 112 shown in FIG. 1 may be any type of computing device, such as, for example, computing device 600 described below with reference to FIG. 6. By way of example only and not limitation, the content manager 112 may be a personal computer, desktop computer, laptop computer, handheld device, mobile handset, consumer electronic device, a server, a cluster of servers, or the like. It should be noted, however, that embodiments are not limited to implementation on such computing devices, but may be implemented on any of a variety of different types of computing devices within the scope of embodiments hereof.

Components of the content manager 112 may include, without limitation, a processing unit, internal system memory, and a suitable system bus for coupling various system components, including one or more data stores for storing information (e.g., files and metadata associated therewith). The content manager 112 typically includes, or has access to, a variety of computer-readable media. By way of example, and not limitation, computer-readable media may include computer-storage media and communication media. The computing system environment 100 is merely exemplary. While the content manager 112 is illustrated as a single unit, one skilled in the art will appreciate that the content manager 112 is scalable. For example, the content manager 112 may in actuality include a plurality of computing devices in communication with one another. Moreover, the data store 114, or portions thereof, may be included within, for instance, the content manager 112, a third-party service as a computer-storage medium, etc. The single unit depictions are meant for clarity, not to limit the scope of embodiments in any form.

As shown in FIG. 1, the content manager 112 comprises a data collector 118, an abandonment analyzer 120, and a content provider 122. In some embodiments, one or more of the components 118, 120, and 122 may be implemented as stand-alone applications. In other embodiments, one or more of the components 118, 120, and 122 may be integrated directly into the operating system of a computing device, such as the computing device 600 of FIG. 6. It will be understood by those of ordinary skill in the art that the components 118, 120, and 122 illustrated in FIG. 1 are exemplary in nature and in number and should not be construed as limiting. Any number of components may be employed to achieve the desired functionality within the scope of embodiments hereof.

The data collector 118 is configured to obtain or collect data (e.g., via the network 110) for use in determining whether an item is abandoned and/or to provide targeted content to users. In embodiments, the data collector 118 obtains location data, user data, item data, content data, and the like. Although various types of data are described herein, in some implementations, it can be appreciated that additional data may be obtained and/or some data might not be obtained. The data described herein as being obtained are exemplary in nature and not intended to limit the scope of embodiments of the present invention. Further, the data can be provided from any number or type of devices, some examples of which are described herein.

Location data generally refers to any data that indicates location of the user device (or user of the user device), location of an item, location of an object, or the like. In some cases, location data can indicate a geographic location, a location relative to a point of reference, such as a beacon, RFID reader, store section, electronic display, or the like. Location data may be in any number of forms, such as precise location value or a location range (e.g., short distance, 0-5 meters, etc.). As described above, location data can be received from any number of user devices. In this regard, user devices within range of beacons can provide location data detected in accordance with beacon signals to the content manager. In other examples, GPS or wireless data associated with the user device can be used to provide location data to the offer manager. In an alternative or additional embodiment, location data might be transmitted by another component, such as directly from a beacon or RFID reader itself or an intermediary component.

User data refers to any data associated with users. User data can be obtained or collected from any number of devices, such as user device 116. In various embodiments, such information pertaining to users may include a user identifier, location data, user interest data (a set of user interests), a purchase or conversion indicator, an indication of user value, or the like.

A user identifier may be any identifier that identifies a user or a user device. For example, as previously described, in some cases, a subscriber ID method is used. A subscriber ID method uses any number of HTTP subscriber ID headers that uniquely identify a mobile device. The headers often include the device phone number (or a hashed version of the number) or other identifiers. The headers contain information on device ID, client ID, calling line ID, etc. As described in more detail below, such information can be used to identify the user and his or her interests.

User interest data refers to any data associated with an interest to a user. User interest data might indicate an interest of a user or other information relevant to user interests. For example, user interest data might refer to a particular item or product, a particular section or department (e.g., jewelry section), a particular store, a particular time of day, a particular day of week, or the like.

A conversion indicator refers to a probability or other indication associated with a likelihood a user will complete a purchase or other type of conversion. A conversion indicator may be represented in any format, such as a probability, a level of likelihood, or the like. Further, a user may be associated with any number of conversion indicators. For example, a user may have an overall conversion indicator, a conversion indicator associated with each product or item of interest to the user, a conversion indicator associated with predetermined products or items (e.g., specified by a marketer), and/or the like.

A value indicator refers to any indication of a value or priority of the user. In this regard, a user may generally be designated as a high-value user if the user completes a particular number (threshold) of purchases, or spends a particular amount of money with respect to a product, store, store department, or other entity or item. Item data refers to any data associated with an item. Item data may include, for example, an item name, an item number, an item description, or the like.

Content data can also be collected by the data collector 118. Content data refers to any data associated with content for providing to users. Content data can be obtained or collected from any number of devices, such as user device 116 or marketer devices (not shown). A marketer device refers to a device used by a marketer or entity associated with providing an offer or a geographical space. In various embodiments, content data may include an offer, a discount, item information, competitor information, parameters associated with content (e.g., offer parameter), or the like. Parameters associated with content may indicate when, how, frequency, location, or other preferences for providing content. For instance, a content parameter may be a maximum discount that can be given on a particular product. Such information may be provided, for example, by a marketer for each product, each product section, a group of products, or the like. Other examples of a content parameter may include a maximum number of offers that may be provided in a certain time period or certain location.

Although the data collector 118 is described herein as collecting data, various aspects of the data may be collected by other components. For example, content data may be collected at a marketer computing device and referenced therefrom when needed.

The abandonment analyzer 120 is generally configured to analyze abandonment of an item in association with a physical shopping cart. In this regard, the abandonment analyzer 120 analyzes data to determine whether an item has been abandoned. As described in more detail below, the abandonment analyzer 120 can use location data to determine whether an item is abandoned. To this end, targeted content can be provided to users in accordance with an item being abandoned from a physical shopping cart.

As such, in embodiments and at a high level, a determination of whether an item is abandoned from a shopping cart is made. In some implementations, when an item is abandoned from a shopping cart, a user might be provided with an offer to direct him or her back to the item in an effort to result in a purchase of the item. In addition to assessing abandonment of an item within a shopping cart, the abandonment analyzer 120 can evaluate additional data to determine whether to provide content, and/or particular content to provide, to an individual or set of individuals. For example, a reason for the item abandonment may be assessed to identify whether to provide an offer(s) to a user, and/or a particular offer to provide to the user. Various examples are set forth below of methods that may be employed in implementing embodiments or the present invention. As can be appreciated, other implementations not explicitly described herein are contemplated within the scope of embodiments herein.

In some embodiments, to determine whether an item has been abandoned in relation to a shopping cart, an item(s) is initially determined to be placed, carried, or positioned within a shopping cart. Various technology and methodologies may be used to determine an item has been placed in a shopping cart. For example, beacon tags and/or RFID tags can be used to detect placement of an item in a shopping cart.

In cases that beacon tags are attached to individual items, a user device may receive an immediate/near signal from the beacon tag attached to an item. Acceleration data associated with the beacon tag might also be used to indicate the specific item being moved. As described above, the user device can provide location data, as detected from communications from the beacon tag, to the data collector 118. Such data can then be analyzed to identify a beacon ID that corresponds to an item that a user is carrying in a shopping cart.

In cases that RFID tags are attached to individual items and a mobile beacon is attached to the shopping cart, the beacon ID corresponding to the cart from which the user device continues to receive an immediate/near signal can be provided to the data collector 118 indicating the shopping cart that the user is utilizing. An RFID reader installed on a shopping cart utilized by the user can be used to determine the items within the shopping cart using the corresponding RFID tags attached to the items as read by the RFID reader in the shopping cart. Further, use of an accelerometer on the item might be used to detect that an item was placed in a shopping cart. In some cases, a change in location of a user but continued reception of signals from a product beacon can also indicate an addition of a product to the shopping cart. Such technology can be used to detect an interest of an item to a user despite the item being in the shopping cart (e.g., larger items unable to fit in a cart or a product carried in a user's hand). The RFID reader can provide the data directly to the data collector 118, or the data can be provided to the data collector 118 via the user device.

As can be appreciated, in some implementations, detecting items in a shopping cart can be repeated after regular intervals as the user might continue to add more items to the cart or remove items from the cart. In other implementations, items in a shopping cart can be recognized as the items are placed in the shopping cart.

Items deemed placed in the shopping cart can be recorded and tracked such that recognition of an item no longer within the cart can be identified as an abandoned item. For example, upon determining an item is placed in a shopping cart, if at any point of time, it is detected that an item that was earlier present in the cart is no longer present in the cart, the item can be deemed as abandoned in relation to the shopping cart. In addition to identifying abandonment of an item, a time associated with the item abandonment can also be identified.

By way of example only, assume that a beacon tag attached to an item is detected as being in near proximity to the user device. The item can be identified as being placed in the shopping cart at time $t_1$. Now assume, that at a later time $t_2$, the item is no longer detected as being in near proximity to the user device (e.g., based on a lack of signal being received at the user device from the beacon tag). In such a case, the item can be determined to be abandoned at time $t_2$.

Various technology and methodologies may be used to determine that an item previously placed in a shopping cart is no longer in the shopping cart. For example, similar to detecting items placed in the shopping cart, beacon tags and/or RFID tags can be used to detect removal of an item from a shopping cart.

In cases that beacon tags are attached to individual items, a user device may stop receiving an immediate/near signal from the beacon tag attached to an item when the item is removed from the shopping cart. Acceleration data associated with the beacon tag might also be used to indicate the specific item being moved, for example, away from the shopping cart. As described above, the user device can provide location data or lack of location data, as detected from communications from the beacon tag, to the data collector 118. Such data can then be analyzed to identify a beacon ID that corresponds to an item that a user is no longer carrying in a shopping cart.

In cases that RFID tags are attached to individual items and a mobile beacon is attached to the shopping cart, the beacon ID corresponding to the cart from which the user device continues to receive an immediate/near signal can be provided to the data collector 118 indicating the shopping cart that the user is utilizing. An RFID reader installed on a shopping cart utilized by the user can be used to determine items no longer within the shopping cart. Further, use of an accelerometer on the item might be used to detect that an item is removed from a shopping cart. The RFID reader can provide the data directly to the data collector 118, or the data can be provided to the data collector 118 via the user device.

As can be appreciated, in some implementations, detecting items no longer in a shopping cart can be repeated after regular intervals as the user might continue to remove items from the cart. In other implementations, items in a shopping cart can be recognized as the items are removed from the shopping cart. In some cases, recognition of removal of an item from a shopping cart can result in an alert being provided, for example, to a user, a third party, a marketer, etc.

For instance, assume that an item deemed placed in the shopping cart is recorded and tracked using beacon technology in communication between the item and the user's mobile device. Now assume that, at a later time, the item is no longer detected in proximity to the user's mobile device. A data store, table, index, or the like, can be referenced to determine that the item was previously in the shopping cart at time $t_1$ and is no longer detected in the shopping cart at time $t_2$. In such a case, the item can be deemed or designated as abandoned from the shopping cart at time $t_2$.

Figure 2:
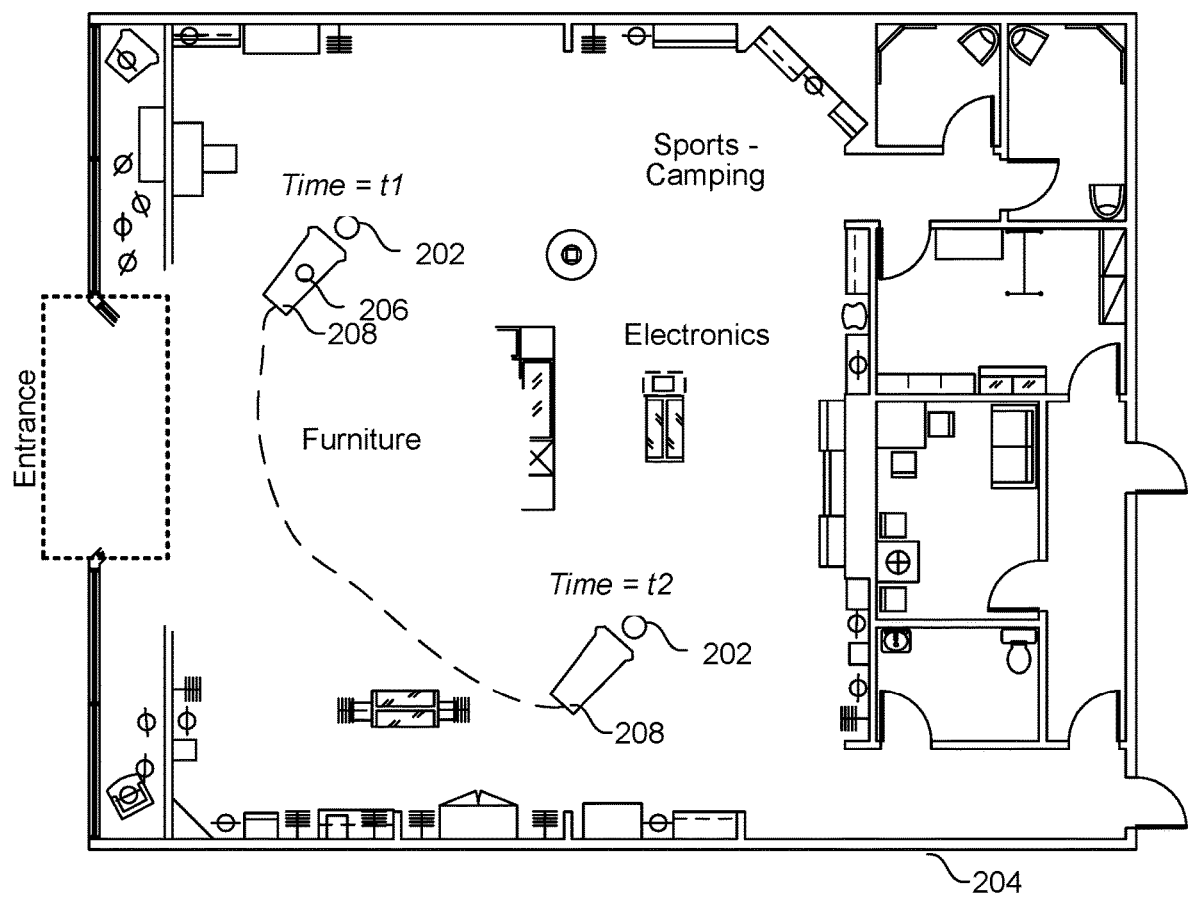
FIG. 2 is a depiction illustrating an exemplary environment for detection abandonment of an item in a shopping cart, in accordance with embodiments of the present invention.

By way of example only, and with reference to FIG. 2, assume that a user 202 is shopping in a brick and mortar store 204. At time $t_1$, the user 202 places product 206 in the shopping cart 208. Detection of placement of the product 206 in the shopping cart 208 might be detected, for example, based on communication between a beacon (not shown) attached to the product 206 with the user's 202 mobile device (not shown). As another example, detection of placement of the product 206 in the shopping cart 208 might be detected based on communication between an RFID tag (not shown) attached to the product 206 with an RFID reader attached to the shopping cart.

Assume now that, at a later time $t_2$, it is determined that the product 206 is no longer in the shopping cart 208. Such detection of removal of the product 206 from the shopping cart 208 might be detected, for example, based on a lack of communication between the beacon attached to the product 206 with the user's 202 mobile device. As another example, detection of removal of the product 206 from the shopping cart 208 might be detected based on lack of communication between an RFID tag attached to the product 206 with an RFID reader attached to the shopping cart. Because the product 206 is no longer placed in the shopping cart 208, the product 206 can be designated as an abandoned item.

In some implementations, in addition to determining an item abandonment, a reason for the item abandonment is identified. In some cases, a reason for an item abandonment can be identified based on timing of the item abandonment in relation to another action(s) performed by a user. Various reasons might exist resulting in item abandonment. By way of example, and not limitation, potential reasons for item abandonment may be a user interest in a competitor product, a user interest in obtaining more details about the abandoned item, or a user decision that the item is not necessary (e.g., based on a budget or shopping cart capacity). As can be appreciated, any number of potential reasons for item abandonment may be analyzed and is not limited to the examples provided herein.

A user interest in a competitor product may result in the user abandoning an item previously within the user's physical shopping cart. As such, embodiments of the present invention contemplate identifying whether a competitor product is the reason for an item being abandoned. An interest in a competitor product may be a reason for an item being abandoned, for example, based on a user viewing an advertisement, a user exploring some other competing product which may have influenced the user, or a user noticing a competing product in a shopping cart of another visitor which may have influenced the user.

As one example for determining whether a user is interested in a competitor product, it can be determined if the user watched a video corresponding to some competitor on a digital or electronic display in the retail store that may have influenced him or her. As such, in accordance with an identification of an item abandonment, any digital displays to which the user was in close proximity are identified, for example, within a duration N (e.g., as specified by a marketer) relative to an item being deemed abandoned. Identification of proximity digital displays can be made in any number of ways. In one implementation, beacons are attached to digital displays. In such an implementation, a user device can receive an immediate/near signal from the beacons attached to the digital displays to identify proximity of digital displays. For each digital display in close proximity (e.g., within a threshold distance) to the user within a time frame, products corresponding to videos being played at the time the user was in close proximity to the digital display can be identified. If any identified product is a competitor of the abandoned item, the competitor product can be deemed to be the reason for the item abandonment.

As another example, a determination can be made as to whether a user explored some other competing product which may have influenced the user. In accordance with an identification of an item abandonment, any products the user explored in the store but did not add to the shopping cart can be determined, for example, within a duration N (e.g., as specified by a marketer) relative to an item being deemed abandoned (e.g., approximate time of abandonment). Determining explored products can be made in any number of ways. For example, beacon and/or RFID technology can be used to detect proximity and/or motion associated with products. Any products that are competitors of the abandoned item can be identified and deemed a reason for abandonment.

As yet another example, a determination can be made as to whether a user saw a competing product in the cart of other visitor which may have influenced the user. In accordance with an identification of an item abandonment, a determination can be made as to whether any carts of other visitors were in the proximity of the user as detected by the user's and/or visitors mobile device(s). For instance, a mobile device can receive signals from shopping carts having beacons attached thereto. In some cases, nearby shopping carts might be detected within a particular time period (e.g., at or about the time of an item abandonment, within x time of an item abandonment, etc.). For the visitor shopping carts identified as proximate to the user, an identification of products present in those shopping carts can be made. If any of the products present in other visitor's shopping carts are competitors to the product the user abandoned, a competitor or competing product can be deemed the reason for abandonment.

Another example of a potential reason for item abandonment may be a user interest in obtaining more details about the abandoned item. To identify if a user desires to gather more information about an abandoned item, a determination can be made as to whether the user read about the abandoned item, for example, via reviews or product descriptions. In this regard, detection of utilization of a mobile application, or web site, can be identified and assessed as to the type of information reviewed. In some implementations, such an identification or determination can be made in association with the time of the item abandonment. In other words, use of a web or mobile application can be assessed at, near, or within a threshold time of the item abandonment. If the user reviewed further item information or reviews, a reason for the item abandonment can be designated as being a user interest in obtaining more details about the abandoned item.

A user decision that the item is not necessary (e.g., based on a budget or shopping cart capacity) can be another example of a potential reason for item abandonment. An item might be designated as non-essential or unnecessary based on item abandonment due to the user exceeding a budgeted amount of money intended to be spent, exceeding a shopping cart capacity, etc. For instance, identification can be made as to whether a user's shopping cart was full and, therefore, the user likely abandoned the item to put another item in the shopping cart. Based on the dimensions of the shopping cart and the dimensions of various items in the shopping cart, a determination of how full the shopping cart is can be made. As another example, a sensor can be attached to the shopping cart (e.g., the top of the shopping cart) to detect if items in the shopping cart have reached to a capacity level.

An item might also be designated as non-essential or unnecessary based on item abandonment due to a user exceeding a budgeted amount of money intended to be spent. Significant item costs can be determined when a user abandons an item when proximate or near the billing or checkout counter. A user location near a checkout counter can be detected using a beacon placed at the counter providing signals that are recognized by the user's mobile device. Detecting an item abandonment when the user is near the checkout counter can signify that the user elected not to purchase the item as the user already intends to purchase too many other items, is out of budget, or does not intend to pay for the item.

As can be appreciated, the abandonment analyzer 120 may analyze abandonment of an item(s) at any time. In some cases, the abandonment analyzer 120 may perform an analysis of item abandonment periodically or continually. In other cases, the abandonment analyzer 120 may perform an analysis in accordance with an occurrence of an event. That is, in accordance with detecting an occurrence of an event, abandonment analysis may be triggered. For example, embodiments of the above described abandonment analysis may occur when a user enters a store, enters a product section, adds an item to a shopping cart, detects presence of a beacon, or the like. Such event triggers may be detected using any technology, such as, for instance, GPS, beacons, RFID technology, Wi-Fi technology, user interactions with a mobile device (e.g., activation of an application) or the like.

Content provider 114 is generally configured to generate, select, and/or provide targeted content. Targeted content refers to content that is relevant to or targets a user that abandons an item, for example, previously within a shopping cart of the user. The targeted content or content may be text, advertisements, offers, videos, messages, reviews, text snippets, product descriptions, summaries, or other content that is associated with an item, for instance, an item abandoned from a physical shopping cart. As such, the content provider 114 can generate or select content to provide to a user (e.g., via a user device) when an item is determined to be abandoned or removed from a shopping cart.

In some cases, the content provider 114 can generate, select, or provide targeted content based on an identified reason for the item abandonment. In this regard, upon identifying a reason(s) for an item abandonment, content can be selected to address the identified reason. By way of example, upon detecting that a competitor or competitor product is an identified reason for an item abandonment, content (e.g., a real time push notification) can be sent to the visitor comparing the item that was abandoned with the product explored, a competitor product in another visitor's shopping cart, a competitor product shown on a digital display. Such a comparison may help clear any doubt that a user may have regarding whether to purchase a product that was abandoned or a competing product. As another example, upon detecting that additional information about a product is an identified reason for an item abandonment, content can be sent to the visitor providing product information, such as a product description, a product offer or discount, or the like. In yet another example, upon detecting that a user abandoned an item that is not necessary (e.g., based on a budget or shopping cart capacity), content may be provided asking the user if he or she would like the product shipped (e.g., based on shopping cart capacity) or content may be provided providing a product discount (e.g., free shipping, a discount coupon, etc.).

A set of potential targeted content from which a selection can be made to provide to a consumer can be provided in any number of manners. In some cases, targeted content can be identified automatically, for example, based on web crawling to identify content related to a product. In other cases, targeted content can be provided by, for example, a marketer via a marketer device. To this end, a marketer or other entity can provide targeted content, such as videos, advertisements, text, summaries, reviews, snippets, offers, etc. For example, for each feature in a set of features of a product, a marketer might provide a summary or description of the feature that can be used in the subject of a targeting email; a detailed description of the feature that can be used in the body of a targeting email; a set of product reviews blogs, discussions related to a feature; a set of social posts related to a feature; or the like. As another example, for every competitor in a list of competitors, a marketer may provide a brief description that describes how marketer's product is superior compared to the competitor for a feature; a detailed description that describes how the marketer's product is superior compared to the competitor for a feature; a set of product review blogs, discussions that are positive in relation to a feature as compared to the competitor; a set of public social posts that are positive in relation to a feature compared to the competitor; or the like. Corresponding to every reason, marketer can provide a template and the corresponding time (e.g., in case of billing, end of month) at which to send targeted content. In some implementations, a portal may be accessed and used to provide targeted content. For instance, a portal may be accessed and used to specify targeted content for various feature in different scenarios.

Upon selecting appropriate targeted content, the content provider 114 can then communicate the targeted content. The communication of the targeted content may be done in various ways and in various formats (e.g., email, instant messages, text messages, push notifications, etc.). The targeted content may be communicated directly to the user and, thus, a user device associated with the user such as, for example, the user's smartphone or tablet. Alternatively, the targeted content may be communicated to a device associated with the item of interest. For instance, the targeted content may be provided to the marketer or other entity such that the marketer or other entity can provide to the consumer in a time and manner as designated by the marketer.

In some embodiments, the content provider 114 communicates the targeted content such that more than one user is targeted at the same time and/or at the same device. For example, for a targeted content, a marketer might define a target population, e.g., "Email IDs of recipients included in a given folder/list," wherein the given folder/list may include users that have abandoned a particular item. Recipients may be dynamically added and/or removed from such a list.

As described, the selected targeted content may be provided in any number of forms such as email, instant messages, text messages, notifications, etc. For example, targeted content may be provided in an email, such as a dynamically created email that contains one or more targeted content portions.

Turning now to FIG. 3, a flow chart is illustrated showing an exemplary method 300 of receiving targeted content in response to detection of an item abandonment. In embodiments, the method 300 is performed by a user device. Initially, and as indicated at block 302, it is determined whether a signal from a beacon attached to an item is detected. If a signal is detected, an indication of the proximity of the item relative to a user device is communicated, for example to a content manager. This is indicated at block 304. The process returns to block 302 at which a determination is made as to whether a signal from a beacon attached to the item is detected. After providing an indication of proximity of the item relative to the device on at least one occasion, when it is determined at block 302 that a signal from the beacon attached to the item is not detected, content related to the item is received, as indicated at block 306. In this regard, the item previously detected within proximity to the user device is deemed abandoned and, as such, content can be provided to the user device in an effort to entice the user to purchase the abandoned item.

Referring now to FIG. 4, a flow diagram shows a method 400 for providing targeted content related to an item deemed abandoned. In embodiments, the method 400 is performed by a content manager. Initially, at block 402, an indication of proximity of an item relative to a user device is received. At block 404, a determination is made that the item is no longer in proximity to the user device. Such a determination may be made based on failure to receive proximity information related to the item. At block 406, a reason that the item is no longer in proximity to the user device is determined. Subsequently, at block 408, content is selected to provide a user based on the specific reason that the item is no longer in proximity to the user device. At block 410, content related to the item is provided. Content can be provided to the user device to entice a user to purchase the particular item.

With reference now to FIG. 5, a flow diagram shows a method 500 for providing targeted content related to an item deemed abandoned. In some embodiments, the method 500 is performed by a content manager. Initially, at block 502, an indication of an item within a shopping cart is received. At block 504, a determination is made that the item is no longer in the shopping cart. Such a determination may be made based on failure to receive proximity information related to the item. At block 506, an event is detected that occurs within a time duration of the determination that the item is no longer in the shopping cart. At block 508, it is determined whether the detected event is a potential reason for the item no longer being in the shopping cart. For example, a determination might be made that the item is no longer in the shopping cart based on the user viewing information about a competitor product. If not, the method ends at block 510. If so, at block 512, content is selected to provide to a user based on the specific reason that the item is no longer in the shopping cart. At block 514, content related to the item is provided. Content can be provided to the user device to entice a user to purchase the particular item.

Having described embodiments of the present invention, an exemplary operating environment in which embodiments of the present invention may be implemented is described below in order to provide a general context for various aspects of the present invention. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 918, input/output components 620, and an illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations to provide targeted content based on abandonment of items within physical shopping carts, the operations comprising:
    detecting an item as being positioned in a physical shopping cart at a first time, the physical shopping cart being used in a physical retail store by a user having a user device;
    detecting the item as being removed from the physical shopping cart at a second time after the first time;
    determining a proximity of the user to a physical retail store digital display at the time the item is removed from the physical shopping cart;
    upon detecting the item as being removed from the physical shopping cart and detecting the proximity of the user to the physical retail store digital display, providing targeted content having additional information specific to the item to the user device of the user, wherein the additional information addresses a reason for the item being removed from the physical shopping cart to provide an incentive for the user to purchase the item detected as being removed from the physical shopping cart.

2. The one or more computer storage media of claim 1, wherein the item being positioned in the physical shopping cart being detected by receiving data indicating proximity of the item relative to the user device or the physical shopping cart.

3. The one or more computer storage media of claim 2, wherein the received data indicating proximity of the item relative to the user device or the physical shopping cart is generated based on signals communicated from one or more Internet of Things (IoT) sensors.

4. The one or more computer storage media of claim 1, wherein the item being removed from the physical shopping cart being detected by failing to receive data indicating proximity of the item relative to the user device or the physical shopping cart.

5. The one or more computer storage media of claim 1 further comprising determining the reason for the item being removed from the physical shopping cart.

6. The one or more computer storage media of claim 5, wherein the reason for the item being removed from the physical shopping cart comprises one of a user interest in a competitor product, a user interest in obtaining additional information about the item, or a user decision that the item is not necessary.

7. The one or more computer storage media of claim 5 further comprising selecting the targeted content related to the item in accordance with the reason for the item being removed from the physical shopping cart.

8. The one or more computer storage media of claim 1, wherein the targeted content comprises an offer for the item or a description of the item.

9. A computer-implemented method for providing targeted content based on abandonment of items within physical shopping carts, the method comprising:
    determining an item is abandoned from a physical shopping cart operated by a user when the item previously in the physical shopping cart is no longer in the physical shopping cart;
    determining a reason for the abandonment of the item based on proximity of the user to a physical retail store digital display at the time the item is abandoned from the physical shopping cart;
    selecting targeted content having additional information related to the item, the additional information addressing the determined reason for the abandonment of the item, wherein the additional information provides an incentive for the user to purchase the item; and
    upon detecting the item as being abandoned and detecting the proximity of the user to the physical retail store digital display, providing the targeted content for the user to view on a user device of the user in an effort to entice the user to complete the purchase of the item previously in the physical shopping cart.

10. The method of claim 9 further comprising: determining that the item is placed in the physical shopping cart.

11. The method of claim 9, wherein the reason for the abandonment of the item comprises one of a user interest in a competitor product, a user interest in obtaining additional information about the item, or a user decision that the item is not necessary.

12. The method of claim 9, wherein when the reason for the abandonment of the item comprises a user interest in a competitor product, the selected targeted content comprises a description of the item, a description of the competitor product, or a comparison of the item and the competitor product.

13. The method of claim 9, wherein when the reason for the abandonment of the item comprises a user interest in obtaining additional information about the item, the selected targeted content comprises a description of the item.

14. The method of claim 9, wherein when the reason for the abandonment of the item comprises a user decision that the item is not necessary, the selected targeted content comprises an offer related to the item.

15. A computer-implemented method, the method comprising:
    determining an item is abandoned from a physical shopping cart operated by a user when the item previously in the physical shopping cart is no longer in the physical shopping cart based on a location of a radio-frequency identification "RFID" tag associated with the item;
    determining a reason for the abandonment of the item based on proximity of the user to a physical retail store digital display at the time the item is abandoned from the physical shopping cart;
    selecting targeted content having additional information related to the item, the additional information addressing the determined reason for the abandonment of the item, wherein the additional information provides an incentive for the user to purchase the item; and
    upon detecting the item as being abandoned and detecting the proximity of the user to the physical retail store digital display, providing the targeted content for the user to view on a user device of the user in an effort to entice the user to complete the purchase of the item previously in the physical shopping cart.

16. The computer-implemented method of claim 15, the method further comprising:
    determining that the item is placed in the physical shopping cart.

17. The computer-implemented method of claim 15, wherein the reason for the abandonment of the item comprises one of a user interest in a competitor product, a user interest in obtaining additional information about the item, or a user decision that the item is not necessary.

18. The computer-implemented method of claim 15, wherein determining the item is no longer in the physical shopping cart is based on received data indicating proximity of the item, the proximity of the item based on the RFID tag relative to the user device or the physical shopping cart, wherein the data is generated based on signals communicated from one or more Internet of Things (IoT) sensors.

19. The computer-implemented method of claim 15, wherein the targeted content is provided to the user device as a real-time push notification.

20. The computer-implemented method of claim 15, wherein the targeted content is provided to the user device via a web application or a mobile application in real-time.

\* \* \* \* \*